United States Patent [19]

Seidel

[11] 4,344,725

[45] Aug. 17, 1982

[54] CUTTING INSERT

[75] Inventor: Heinz H. Seidel, Troy, Mich.

[73] Assignee: GTE Products Corporation, Stamford, Conn.

[21] Appl. No.: 166,728

[22] Filed: Jul. 7, 1980

[51] Int. Cl.³ .............................................. B26D 1/00
[52] U.S. Cl. ................................................... 407/114
[58] Field of Search ................. 407/114, 113, 115, 116

[56] References Cited

U.S. PATENT DOCUMENTS

| 3,487,515 | 1/1970 | Contrucci | 407/114 |
| 3,882,580 | 5/1975 | Lundgren | 407/116 |
| 4,189,265 | 2/1980 | Arnold et al. | 407/114 |

Primary Examiner—Leonidas Vlachos
Attorney, Agent, or Firm—Robert E. Walter

[57] ABSTRACT

A cutting insert of the indexable type comprises intersecting surfaces which form a pair of chip control channels associated with a respective cutting edge. The channels merge at respective corners and terminate at an intermediate land portion which is arcuate and extends inwardly from a respective side surface at an angle less than ninety degrees.

2 Claims, 3 Drawing Figures

CUTTING INSERT

The present invention relates to disposable cutting inserts, particularly to cutting inserts such as are adapted for being detachably mounted on a tool holder and for cutting a work piece.

Cutting inserts of a type referred to are generally made of a cemented metal carbide and are formed by pressing techniques after which the pressed articles are sintered.

In the type of inserts referred to herein, it is desirable to have an indexable insert which presents a positive rake cutting edge to the work piece. Inserts of this type are described in the following discussed patents.

U.S. Pat. No. 3,487,515 to Contrucci discloses an insert having top and bottom supporting surfaces comprising an island spaced inward from the peripheral sides adjacent the cutting points and extending out to the peripheral sides intermediate the cutting points to increase the stability of support for the insert.

U.S. Pat. No. 3,885,281 to Stambler discloses an insert having both longitudinally curved and transversely curved channels along the side edges of the insert meeting at the corners of the insert. At each corner of the insert, V-shaped shallow grooves are depressed into the merging portions of the deeper longitudinal channels to provide chip control for shallow depth cuts.

U.S. Pat. No. 3,882,580 to Lundgren describes a cutting insert of the type having a longitudinal groove extending entirely around the insert adjacent the side surfaces wherein an inactive portion of the cutting edge has a continuously decreasing rake angle.

U.S. Pat. No. 3,786,541 to Lundgren relates to a cutting insert having chip breakers in two stages wherein the cutting edge and the associated chip breaker describe a curve of a particular description.

U.S. Pat. No. 4,056,872, which issued to the inventor of the present application, relates to an insert having inner and outer portions of the chip breaking channel being provided with straight faces.

U.S. Pat. No. 3,792,515 to Lundgren relates to a cutting insert wherein the cutting edge and associated chip-breaker describe a curve composed of straight or arched parts in the plane of the side face.

U.S. Pat. No. 3,786,540 describes an insert having chip control groove extending along a side surface. The width of the groove describes a compound curve such that the width varies along the length of the side in such a manner that the width at the midpoint of the side is less than the width which points intermediate the midpoint and at the ends of the side.

U.S. Pat. No. 3,399,442 to Jones describes an insert having chip control groove along the entire outer edge comprises an inner and outer region. The outer region is concave in cross section.

SUMMARY OF THE INVENTION

In accordance with the present invention there is provided a cutting insert comprising a polygonal body having substantially parallel surfaces and peripheral side surfaces substantially normal to said parallel surfaces joining to form corners of said parallel surfaces joining to form corners of said polygon, at least one of said parallel surfaces having grooved recesses merging at and descending from respective corners of said polygon adjacent respective peripheral side surfaces, inner land portions extending downwardly and outwardly from a respective parallel surface toward a respective side surface, each inner land portion comprising a pair of end face portions joining an intermediate face portion, each of said grooved recesses including a respective end face and adjoining outer land portion, said adjoining outer land portion extending inwardly and downwardly at an acute angle from a side surface to form a cutting edge therewith, each side surface having associated therewith a pair of adjoining outer land portions and an intermediate land portion, said intermediate land portion being arcuate and extending inwardly from a respective side surface to said intermediate face portion at an angle of less than ninety degrees to said respective side surface.

DETAILED DESCRIPTION

Figure 1:
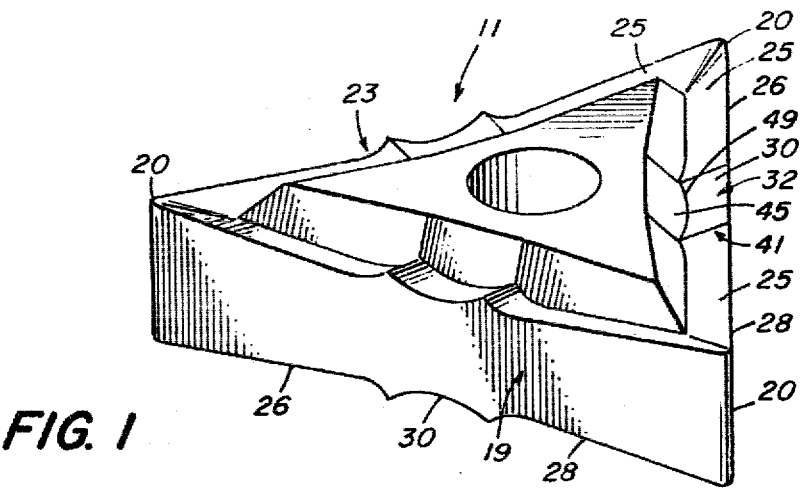
FIG. 1 is a perspective view of one embodiment of the preferred invention.

With reference to FIG. 1, there is illustrated a cutting insert 11 in accordance with the preferred embodiment of the present invention. As shown, the cutting insert 11 comprises a polygonal body having substantially parallel surfaces 15, 17 in the form of respective upper and lower surfaces and peripheral side surfaces 19 substantially normal to the upper and lower surfaces 15, 17. The side surfaces 19 meet to form corners 20 at the ends of the side surfaces 19. At least one of the parallel surfaces 15, 17 has chip control channels or grooved recesses 21 merging at and descending from each of the respective corners 20 of the polygon. Channels 21 extend adjacent the peripheral side surfaces 19. Although the insert 11 shown in the drawings is triangular in shape, it is contemplated that the insert 11 may be in the shape of any polygon such as square, diamond or rectangular.

As further illustrated in FIG. 1, the insert 11 includes a plurality of planar outer land portions 25 associated with and forming at least a pair of cutting edges 26, 28 with each side surface 19. Cutting edges 26, 28 are formed by the intersection of each of the outer land portions 25 with a respective side surface 19. Each of the outer land portions 25 forms an angle less than 90° or an acute angle with an adjacent peripheral side surface 19. This first direction is downwardly toward the interior of the insert 11 with a plane normal to a peripheral side surface 19. The slope of the outer lands 25 in the first direction imparts a positive rake angle to the cutting edges 26, 28.

Figure 2:
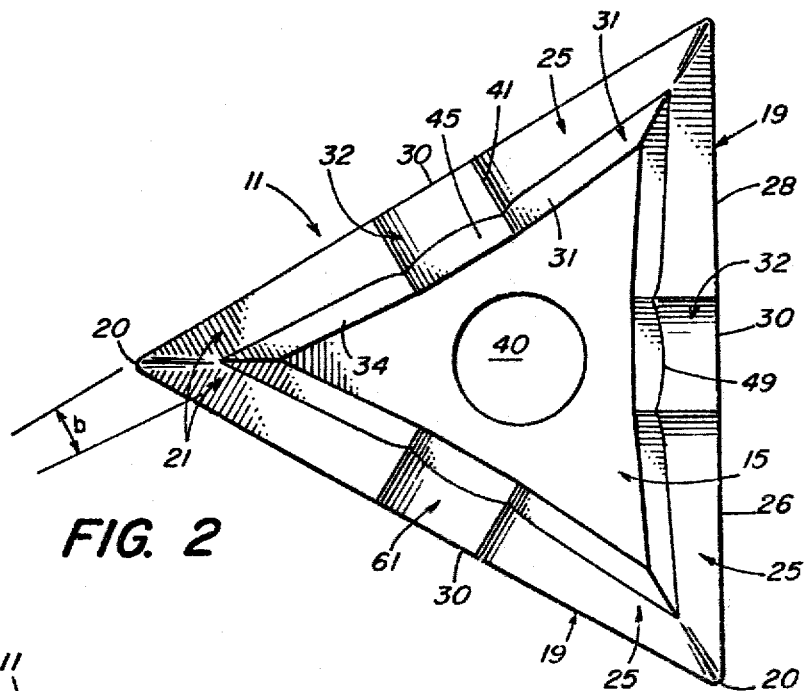
FIG. 2 is a top plan view of the embodiment of FIG. 1.
Figure 3:
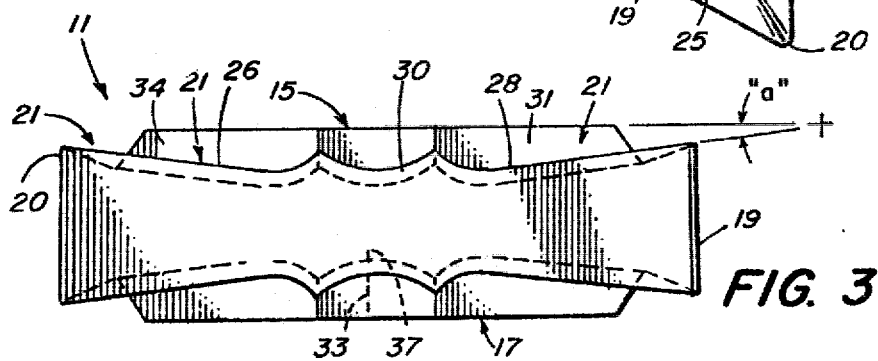
FIG. 3 is a side elevational view of the embodiment as shown in FIG. 2.

Each of the outer lands 25 descend downwardly in a second direction from one of the corners 20 along respective peripheral sides surfaces 19 toward an adjacent one of the corners 20. When the outer land portions 25 are observed from a planar view as illustrated in FIG. 3, each of the outer land portions 25 extends downwardly in the second direction at an acute angle from a respective corner 20. This angle is shown as angle a in FIG. 2. This second direction is normal to the first direction hereinbefore discussed. It is preferred that angle "a" is of about 6°. The slope of outer lands 25 in the second direction influences the direction of chip flow.

As a continuation of the above described cutting edges 26, 28, an intermediate edge 30 is formed by the intersection of an intermediate land 32 with a respective side surface 19. As illustrated in FIG. 3, the intermediate land 32 extends inwardly at an angle of less than 90° from a respective side surface 19. Preferably the acute angle is from about 85° to about 60°. Due to the acute angle, the intermediate land 32 slopes downwardly and inwardly within a plane normal to a peripheral side surface 19 so as to form an intermediate grooved recess 61.

An inner land portion 23 extends downwardly and outwardly from a respective surface 15, 17 toward a respective side surface 19. Each peripheral side surface 19 has an inner land portion 23 associated therewith and spaced inwardly therefrom. Each of the inner land 23 comprises a pair of end face portions 31, 32 joining a single intermediate face portion 45. The one end of the end portions 31, 32 are spaced inwardly from the polygonal corners 20 and rise above the merging outer land portions 25 near the corners 20. The other ends of end face portions 31, 32 conjunctionally join the intermediate face portion 43 so as to bridge the intersecting end outer face portions 31, 32. The common juncture 33 is inward of the intermediate face portion 43. The inner land portion 23 at the intermediate face portion 43 is closer to the peripheral side than would be the case if the inner land portion 23 were formed only be insecting outer face portions 31, 32.

The face portions 31, 32 lie substantially in planes which intersect at a first common juncture 33 which extends downwardly from a respective parallel surface toward the interior of the insert 11. With reference to FIG. 2, it can also be seen that intersection of face portion 31 with surface 15 forms an angle "b" with side surface 19 of about 6°. The adjoining plane of faced portion 32 similarly forms this angle with a side surface 19 but in an opposing manner to that illustrated for face portion 31.

The end face portions 31, 32 join one of the respective outer land portions 25 for forming the channels 21 which are associated with respective cutting edges 26, 28. Each of the cutting edges 26, 28 as hereinbefore described has one of the respective channels 21 adjacent to and extending along a length thereof. As illustrated in FIG. 2, the channels 21 terminate at the junction of the outer land portion 25 with the intermediate land portion 32. The intermediate face portion 43 conjunctively joins the intermediate land portion 32 so as to form an intermediate grooved recess 61.

The intermediate land portion 32 which is interposed outer land portions 25 is formed as an arcuate shaped dip. The intermediate land portion 32 is connected to and joins respective outer land portions 25 at junction regions 41. Preferably at least a portion of the intermediate land portion 32 is formed below the intersecting planes of the outer land portions 25. The junction regions 41 may be formed in a variety of constructions. As illustrated in FIG. 1, the junction regions 41 extend rearwardly from the peripheral side 19 along merging paths. It is contemplated that the junction regions may extend rearwardly along parallel or diverging paths. The junction regions 41 which blend different land may be in the form of a fillet with the intermediate land portion 32 merging gradually into the outer land portions 25. In one construction of the insert 11 (not shown), it is contemplated that the junction regions 41 be at an angle of ninety degrees or greater with respect to side surfaces 19 so that the chip control channel which normally extends about the entire periphery is interupted along each of the peripheral side surfaces 19 in two places.

At least a portion of outer land portions 25 lie in respective planes which intersect at a second common juncture 37 shown as a dotted line in FIGS. 3 and 4. The line 37 is formed by an extension of the respective planes below the ends of a respective side.

The insert 11 includes a central opening 40 extending therethrough to facilitate positioning the insert 11 in a tool holder. The opening 40 provides a means whereby a mating member can be fitted within the opening 40 to secure the insert to the work holder. It is also possible to use a center post and washer-nut combination to hold the insert in place in addition to several other well known securing devices. When the insert 11 of the present invention is positioned in a negative rake holder of the type wherein the insert is tilted downwardly, the insert of the present invention provides a positive back rake angle to the work piece along the respective cutting edges 26, 28 eminating from the corners 19 thereof and a negative back rake angle at the intermediate edge portion 30.

While there have been shown and described what are presently considered the preferred embodiments of the present invention, it will be obvious to those skilled in the art that various changes and modifications may be made therein without departing from the scope of the invention as defined by the appended claims.

I claim:

1. A cutting insert comprising a polygonal body having substantially parallel surfaces and peripheral side surfaces substantially normal to said parallel surfaces joining to form corners of said parallel surfaces joining to form corners of said polygon, at least one of said parallel surfaces having grooved recesses merging at and descending from respective corners of said polygon adjacent respective peripheral side surfaces, inner land portions extending downwardly and outwardly from a respective parallel surface toward a respective side surface, each inner land portion comprising a pair of end face portions joining an intermediate face portion, each of said grooved recesses including a respective end face and adjoining outer land portion, said adjoining outer land portion extending inwardly and downwardly at an acute angle from a side surface to form a cutting edge therewith, each side surface having associated therewith a pair of adjoining outer land portions and an intermediate land portion, said intermediate land portion being arcuate and extending inwardly from a respective side surface to said intermediate face portion at an angle of less than ninety degrees to said respective side surface.

2. A cutting insert according to claim 1 including junction regions, said intermediate land portion merging with a respective outer land portion at each junction region, each junction region extending at an angle of 90° or greater to a respective side surface.

* * * * *